United States Patent [19]
Reinsch et al.

[11] 3,814,512
[45] June 4, 1974

[54] OPERATING MEANS FOR MOTION PICTURES PROJECTORS OR THE LIKE

[75] Inventors: Herbert Reinsch, Kongen; Wolfgang Riedel, Winnenden, both of Germany

[73] Assignee: Robert Bosch Photokino GmbH, Stuttgart, Germany

[22] Filed: June 15, 1972

[21] Appl. No.: 262,974

[52] U.S. Cl. ................. 352/178, 352/169, 352/174
[51] Int. Cl. ............................................. G03b 1/00
[58] Field of Search ........... 352/174, 178, 169, 244, 352/139; 95/53 E

[56] References Cited
UNITED STATES PATENTS
1,943,303   1/1934   Foster ........................... 352/169 X
2,804,799   9/1957   Ames .............................. 352/139
3,246,944   4/1966   Winkler .......................... 352/174 X Primary Examiner—Monroe H. Hayes
Attorney, Agent, or Firm—Michael S. Striker

[57] ABSTRACT

A motion picture projector wherein a rotary knob carries a pinion which meshes with the rack of a reciprocable slide having several longitudinally spaced cam faces which cooperate with pivotable levers. The levers serve to actuate various movable devices or units in the projector, such as the sound head, the loop former, a device for moving the film threading mechanism and others. At least one of the levers further serves as a stop for the slide and/or as part of detent means for yieldably holding the slide in one or more predetermined positions.

5 Claims, 3 Drawing Figures

PATENTED JUN 4 1974 3,814,512

OPERATING MEANS FOR MOTION PICTURES PROJECTORS OR THE LIKE

BACKGROUND OF THE INVENTION

The present invention relates to cinematographic apparatus in general, especially to motion picture projectors, and more particularly to improvements in operating means for such apparatus. Still more particularly, the invention relates to improvements in means for operating various movable units or devices in or on the housing of a cinematographic apparatus, such as a sound head, a loop former, a device for moving the film threading mechanism and/or others.

It is already known to provide a motion picture projector with a single operating member which normally assumes the form of a rotary knob. An advantage of such operating means is that it contributes to the eye-pleasing appearance of the apparatus because the housing need not be provided with several slots or otherwise configurated openings which permit entry of dust and/or other foreign matter. Furthermore, the elimination of several openings simplifies the construction of the housing and facilitates the work of the operator because two or more different units in the housing of the projector can be actuated or deactivated by a single operating member. This is of particular advantage to an unskilled operator who need not waste time to detect the appropriate operating member in order to initiate or terminate the operation of a particular device or unit. As a rule, the shaft of the rotary knob in a conventional motion picture projector carries in the interior of the housing several coaxial cams each of which is tracked by one or more followers which are operatively connected with the corresponding motion receiving mechanisms or units.

A drawback of the just described conventional operating member for several motion receiving units is that it must be mounted at a considerable distance from one or more units. Therefore, the housing of the apparatus must accommodate a complex system of levers, gears and/or other motion transmitting mechanisms which link the single operating member with the remote motion receiving unit or units. Such motion transmitting means occupy much room and their components must be sufficiently bulky and sturdy to be capable of transmitting motion through a considerable distance. The situation is further aggravated if certain motion receiving units must be actuated while the operating member turns in one direction whereas the other unit or units receive motion while the operating member is caused to turn in the opposite direction. Since the cams on the operating member are axially spaced from each other, they and the associated followers occupy much room in that portion of the housing or cover which is immediately adjacent to the operating member. Such room is not always available, especially if the operating member is to be mounted with a view to be readily accessible to the operator of the cinematographic apparatus.

SUMMARY OF THE INVENTION

An object of the invention is to provide a cinematographic apparatus, particularly a motion picture projector, with novel and improved operating means for a plurality of motion receiving units which occupies less room than heretofore known operating means, which comprises a relatively small number of simple parts, and which can be mounted at any desired location on the housing or cover of a cinematographic apparatus because its space requirements are surprisingly small.

Another object of the invention is to provide operating means which shares the advantages of presently known single-knob operating means but avoids all serious drawbacks of conventional operating means, particularly as concerns the cost, space requirements and complexity.

A further object of the invention is to provide novel and improved means for transmitting motion from a single operating member to a large number of discrete motion receiving units in a motion picture projector or the like.

A feature of the invention resides in the provision of a cinematographic apparatus which comprises a housing or an analagous support, a single operating member which is accessible without the apparatus and is movable (preferably rotatable) with respect to the support, a cam carrier mounted in the support for substantially reciprocatory movement in response to movement of the operating member and having at least one but preferably a substantial number of cam faces, and actuating means for one but preferably several motion receiving units. The actuating means comprises at least one but preferably two or more followers which are movably (e.g., pivotably or reciprocably) mounted in the support and track the cam face or faces to thereby perform at least one predetermined movement in response to movement of the carrier. A single follower may track two or more cam faces, one after the other, depending on the momentary position of the carrier. It is also possible to provide a discrete cam face for each follower, and at least one of the followers may form part of detent means for yieldably holding the carrier in one or more predetermined intermediate positions. Still further, at least one of the followers may serve as a means for arresting the carrier in an end position and/or for urging the carrier from such end position.

The novel features which are considered as characteristic of the invention are set forth in particular in the appended claims. The improved operating means itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
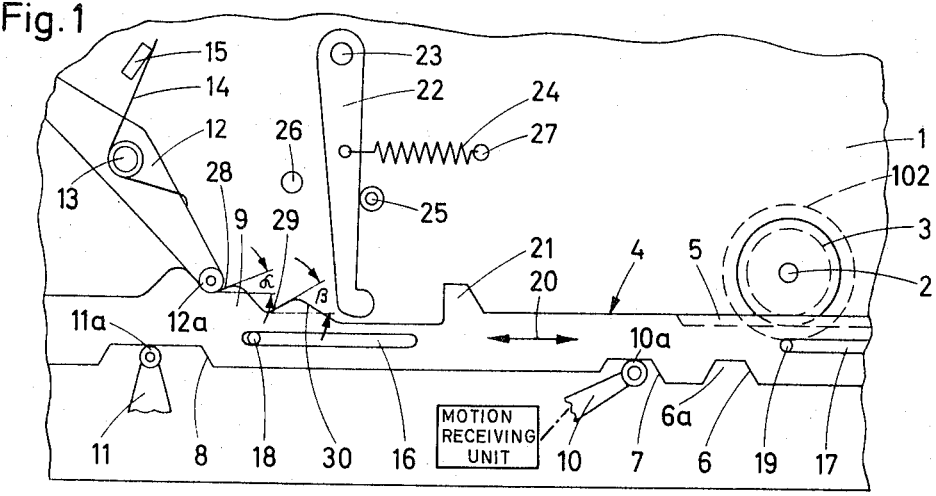
FIG. 1 fragmentary a fragmenary sectional view of a motion picture projector which is provided with operating means embodying one form of the invention.

Referring to FIG. 1, there is shown a portion of a cinematographic apparatus, e.g., a motion picture projector, which comprises a housing or support 1 mounting the shaft 2 of a rotary operating member 102 (hereinafter called knob for short). The inner portion of the shaft 2 is connected with a gear 3 which meshes with the toothed rack 5 of a reciprocable cam carrier or slide 4. The latter is provided with several elongated slots including the slots 16, 17 which respectively receive guide pins 18, 19 provided therefor in the housing 1. The slide 4 is formed with several recesses and projections or lobes which are provided with suitably configurated and inclined cam faces for a series of followers which are moved in a predetermined sequence and to a predetermined extent in response to movement of the slide 4 from and back to the end position of FIG. 1. The cam faces include two similarly inclined cam faces 6 and 7 which surround two longitudinally spaced recesses 6a, 7a provided in the lower edge face of the slide 4, as viewed in the drawing. The lower edge face of the slide 4 is further provided with a third recess 8a which is bounded by a third cam face 8. The upper edge face of the slide 4 is provided with a composite lobe 9 which is formed with a further cam face defining several hills and two valleys or notches 28, 29 which serve as a part of detent means for the slide. The detent means further includes a roller 12a on one arm of a two-armed follower lever 12 mounted in the housing 1 on a pivot pin 13 and being biased in a clockwise direction, as viewed in FIG. 1, by a torsion spring 14. The latter is convoluted around the pivot pin 13 and one of its legs engages a fixed retainer 15 of the housing 1. A second follower lever 10 has a roller 10a which can track the cam face 6 or 7, and a third follower lever 11 has a roller 11a which tracks the cam face 8. The pivot pins for the levers 10 and 11 are not shown in the drawing; these levers can have two or more arms or are rigidly connected with their pivot pins so that such pins turn about their respective axes in response to movement of the cam face 6 or 7 along the roller 10a or in response to movement of the cam face 8 along the roller 11a.

When the user of the apparatus decides to rotate the knob 102, the slide 4 moves in a direction to the left or in a direction to the right (see the double-headed arrow 20) and is confined to a reciprocatory movement by the guide pins 18, 19. The slide 4 is further provided with a projection 21 which can engage the free end of a one-armed follower lever 22 mounted on a shaft 23 and biased by a helical spring 24 so that it normally bears against a stationary or adjustable stop 25. The spring 24 is attached to a stationary post 27 and the housing 1 is provided with a fixed stop 26 which is located in the path of counterclockwise pivotal movement of the lever 22 and can arrest the slide 4 in its left-hand end position.

That portion of the cam face on the lobe 9 which flanks the right-hand side of the notch 28 makes with the direction of movement of the slide 4 an angle alpha which is smaller than the angle beta between the similarly inclined portion of the cam face flanking the right-hand side of the notch 29 and the direction of lengthwise movement of the slide 4. This insures that the retaining or positioning action of the lever 12 upon the slide 4 does not change when the roller 12a enters the notch 28 or 29. A further cam face portion 30 on the lobe 9 can produce a similar retaining or locating action when it is in engagement with the roller 12a or with a suitably rounded free end portion of the one-armed follower lever 22. The inclination of the cam face portion 30 and the bias of the spring 24 are selected in such a way that the retaining action of the lever 22 (when in engagement with the cam face portion 30) at least approximates but preferably closely matches the retaining action of the lever 12 when the roller 12a extends into the notch 28 or 29 or engages the cam face portion 30. The levers 12 and 22 thus form with the lobe 9 a detent structure which can yieldably hold the slide 4 in three predetermined spaced apart intermediate positions in such a way that the force which is needed to move the slide 4 beyond such intermediate positions is always the same.

When the user of the apparatus decides to rotate the knob 102 in a direction to move the slide 4 lengthwise, the fingers of the user readily detect those positions of the slide in which the lever 22 respectively engages the cam face portion 30 and the roller 12a engages the cam face portion 30 or extends into the notch 28 or 29. Such lengthwise movement of the slide 4 results in pivotal movements of the levers 10, 11, 12 and 22 whereby the pivotal movements of these levers take place in a predetermined sequence and to a predetermined extent. Each of the levers 10, 11, 12 and 22 can actuate a different motion receiving unit of the cinematographic apparatus. For example, one of the levers 10–12, 22 can move the pressure plate away from the film gate of a motion picture projector, another lever can move the threading mechanism for the leader of motion picture film to and from its operative position, a further lever can move the sound head into and from engagement with the sound track of motion picture film, and the fourth lever can start or arrest the motor of the motion picture projector.

Figure 2:
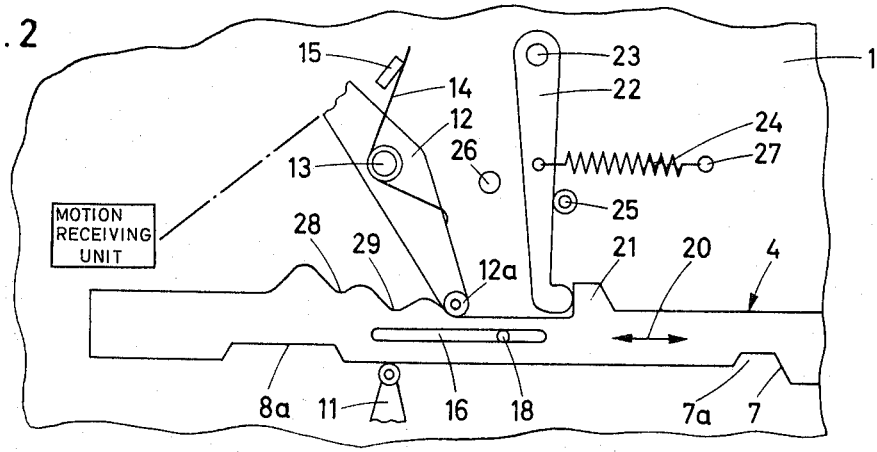
FIG. 2 illustrates a portion of the structure of FIG. 1 but with the cam carrier in a predetermined intermediate position.
Figure 3:
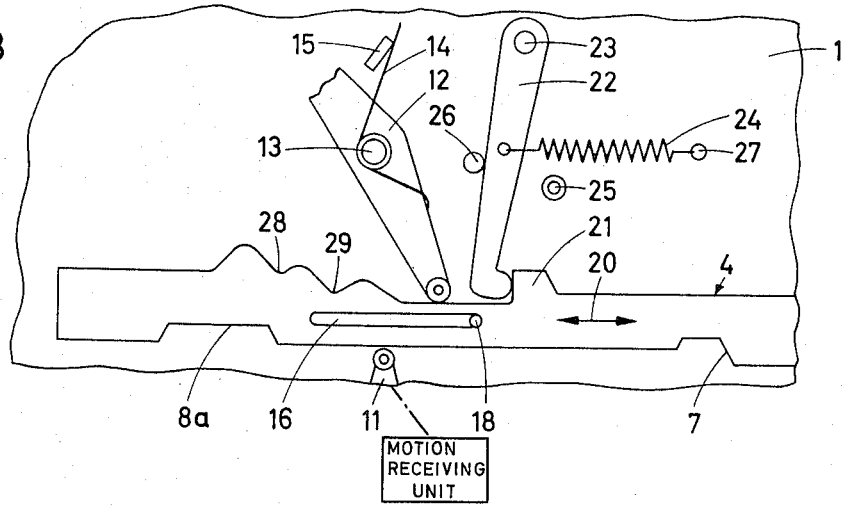
FIG. 3 illustrates the structure of FIG. 2 but with the cam carrier in an end position.

FIG. 2 shows the slide 4 in an intermediate position in which the roller of the follower lever 10 (not shown in FIG. 2) has been expelled from the recess 7 and the lever 22 is about to be engaged and pivoted by the projection 21. The spring 14 biases the roller 12a of the lever 12 against the cam face portion 30 and the roller 11a of the lever 11 is expelled from the recess 8. In FIG. 3, the slide 4 dwells in its left-hand end position in which the projection 21 maintains the lever 22 in engagement with the fixed stop 26 and the lever 12 assumes a position of maximum inclination with respect to the slide 4 because the roller 12a engages the slide at a point which is located to the right of the cam face portion 30. The movement of the slide 4 from the intermediate position of FIG. 2 to the end position of FIG. 3 may serve to form a loop in the film which has been threaded through the projector. The making of such loop is completed when the lever 22 reaches and is arrested by the stationary stop 26. When the knob 102 is thereupon released, the spring 24 is free to contract and pivots the lever 22 counterclockwise whereby the lever 22 pushes the projection 21 in a direction to the right. Such movement of the slide 4 is arrested by the lever 12 in the first intermediate position of the slide, namely, when the roller 12a engages the cam face portion 30. The user must thereupon rotate the knob 102 in a counterclockwise direction in order to move the slide 4 to the second intermediate position (in which the roller 12a extends into the notch 29), to the third intermediate position (in which the roller 12a enters the notch 28) and to the fourth detent position in which the rounded lower end portion of the lever 22 engages the cam face 30).

It is clear that the slide 4 or an analogous cam carrier can be employed to transmit motion to a single follower or to two, three, five or more followers. Furthermore, at least one of the followers may be mounted for reciprocatory rather than pivotal or rotary movement. For example, the lever 11 can be replaced with a slide which is mounted in suitable ways for movement transversely of the slide 4 and is biased by a spring so that its roller 11a always bears against the lower edge face of the slide 4. Still further, the slide 4 itself can be used to actuate one or more motion receiving units in or on the apparatus. Also, the knob 102 can be replaced by a reciprocable or pivotable operating member.

The lever 22 cooperates with the fixed stop 26 to determine the left-hand end position of the slide 4. When the slide 4 reaches such left-hand end position and the operator ceases to hold the knob 102, the spring 24 contracts and moves the lever 22 counterclockwise whereby the lever 22 entrains the slide 4 and the latter is compelled to leave its left-hand end position. The lever 22 may be omitted and the spring 24 may be replaced by a cushion provided on the slide 4 and engaging the stop 26 or a similar stop in the left-hand end position of the slide to propel the latter from such end position as soon as the knob 102 allows such movement. Also, the spring 24 can operate between the support 1 and the slide 4 so as to expand and to store energy during movement of the slide 4 toward its left-hand end position whereby the slide moves in a direction to the right as soon as the knob 102 is released because the spring is then free to dissipate energy. The slide 4 can be automatically arrested by the detent structure so that it assumes its first predetermined intermediate position, for example, a position in which the roller 12a of the follower lever 12 engages the cam face portion 30 on the lobe 9.

The drawing further shows several schematically indicated motion receiving units which are associated with and actuatable by the follower levers. The motion receiving unit which is associated with the lever 11 or 12 is assumed to be remotest from the knob 102, and it will be noted that the left-hand end of the slide moves close to or into immediate proximity of such remotest motion receiving unit when it is caused to assume its left-hand end position in which the lever 22 abuts against the fixed stop 26. It will be noted that the motion receiving units flank the path of the slide 4, i.e., that at least one such unit is mounted at each side of the slide. The slide may extend transversely through a substantial part of the housing 1 so that it can actuate simple and lightweight followers placed close to the respective motion receiving units.

The nature of the motion receiving units has been discussed above, i.e., one of these units can form a loop of motion picture film, another unit can move the film threading mechanism to or from operative position, a further unit can start or stop the motor, another unit can move the pressure plate, and still another unit can move the sound head. In accordance with a presently preferred embodiment of the invention, the slide 4 causes the follower lever 22 or another follower to actuate a film looping unit during movement of the slide from the position of FIG. 2 to that of FIG. 3. Once the loop is formed and the user releases the knob 102, the slide 4 automatically moves under the action of the spring 24 and comes to rest in the intermediate position of FIG. 2. The making of a loop follows the threading of the leader of motion picture film through the projector.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, particularly in a motion picture projector, a combination comprising a support; a single operating member accessible from without the apparatus and movably mounted on said support; a cam carrier mounted in said support for substantially reciprocatory movement in response to movement of said operating member, said carrier having at least one cam face; actuating means including at least one follower movably mounted in said support and arranged to track said cam face and to thereby perform at least one predetermined movement in response to movement of said carrier, said follower being movable by said carrier to a predetermined end position; stop means for arresting said follower and said carrier in said predetermined end position of said follower; and means for biasing said follower away from said end position whereby said follower entrains said carrier when said operating member allows such movement of said carrier under the action of said biasing means.

2. A combination as defined in claim 1, wherein said operating member is rotatable with respect to said support.

3. A combination as defined in claim 1, wherein said operating member is rotatable with respect to said support and comprises a gear, said carrier including a toothed rack meshing with said gear.

4. A combination as defined in claim 1, further comprising detent means for yieldably holding said carrier in at least one predetermined position with respect to said support.

5. A combination as defined in claim 1, wherein said follower is movable to a second end position and said cam face engages said follower in said second end position to thereby hold the carrier against movement of said cam face past said follower.

* * * * *